(12) United States Patent
Wüster (10) Patent No.: US 9,918,434 B2
(45) Date of Patent: Mar. 20, 2018

(54) BOUNDARY WALL WITH REINFORCEMENT DEVICE

(76) Inventor: Heinrich Wüster, Imst/Tirol (AT)

( * ) Notice: Subject to any disclaimer, the term of this patent is extended or adjusted under 35 U.S.C. 154(b) by 1242 days.

(21) Appl. No.: 13/447,330

(22) Filed: Apr. 16, 2012

(65) Prior Publication Data

US 2013/0025195 A1 Jan. 31, 2013

(30) Foreign Application Priority Data

Jul. 29, 2011 (AT) .................. A1112/2011

(51) Int. Cl.
*A01G 1/08* (2006.01)
(52) U.S. Cl.
CPC ..................... *A01G 1/08* (2013.01)
(58) Field of Classification Search
CPC ............... A01G 1/08; E01C 11/221
USPC ........................................... 47/33
See application file for complete search history.

(56) References Cited

U.S. PATENT DOCUMENTS

| | | | | | |
|---|---|---|---|---|---|
| 2,891,352 | A | * | 6/1959 | Altman | 47/19.1 |
| 3,726,042 | A | * | 4/1973 | Haile | A01G 1/08 256/19 |
| 4,967,522 | A | * | 11/1990 | Keen | 52/102 |
| 5,157,867 | A | * | 10/1992 | Fritch | 47/33 |
| 5,283,994 | A | * | 2/1994 | Callison | 52/71 |
| 5,720,128 | A | * | 2/1998 | Smith | A01G 1/08 404/7 |
| 6,085,458 | A | * | 7/2000 | Gau | A01G 1/08 47/33 |
| 6,389,742 | B1 | * | 5/2002 | Wuster | 47/33 |
| 7,966,766 | B2 | * | 6/2011 | Vogler et al. | 47/19.1 |
| 2009/0038238 | A1 | * | 2/2009 | Kurtz | A01G 1/08 52/102 |
| 2010/0242357 | A1 | * | 9/2010 | Vogler et al. | 47/33 |
| 2011/0252702 | A1 | * | 10/2011 | Gazjuk | 47/33 |
| 2012/0276342 | A1 | * | 11/2012 | Bray | E01C 13/08 428/174 |
| 2015/0208593 | A1 | * | 7/2015 | Aronow | A01G 1/08 47/65.5 |
| 2017/0215345 | A1 | * | 8/2017 | Penterman | A01G 1/08 |

FOREIGN PATENT DOCUMENTS

| | | | | |
|---|---|---|---|---|
| DE | 19815971 | A1 * | 10/1999 | E01C 11/22 |
| EP | 0981 948 | B1 | 3/2000 | |
| GB | 39 08 90 | A | 4/1933 | |
| GB | 2369979 | A * | 6/2002 | A01G 1/08 |
| JP | 11313545 | A * | 11/1999 | A01G 1/08 |

* cited by examiner

*Primary Examiner* — Monica L Williams
*Assistant Examiner* — Magdalena Topolski
(74) *Attorney, Agent, or Firm* — Jordan IP Law, LLC; Todd A. Vaughn (57) ABSTRACT

A boundary wall for framing beds, hotbeds, boundaries in gardens and green areas that includes construction elements configured for connection to each other. Each construction element includes a base body with projecting end sections having connection elements configured to support coupling elements. The connection elements also receive by form-fit at least one reinforcing coupling element which thereby connect the construction elements to each other and/or with other construction elements.

13 Claims, 6 Drawing Sheets

BOUNDARY WALL WITH REINFORCEMENT DEVICE

CROSS-REFERENCE TO RELATED APPLICATIONS

The present application claims priority under 35 U.S.C. § 119 to Austrian Patent Application No. A1112/2011 (filed on Jul. 29, 2011), which is hereby incorporated by reference in its entirety.

FIELD OF THE INVENTION

The invention relates to a boundary wall for framing beds, hotbeds, boundaries in garden or green areas or the like, and includes elongated construction elements that can be interconnected, each including a base body having projecting end sections at its faces with connection elements formed thereat to accept coupling elements.

BACKGROUND OF THE INVENTION

Several devices are known from the prior art for the creation of boundary walls for framing beds, hotbeds, boundaries in gardens or green areas or the like.

Figure 1:
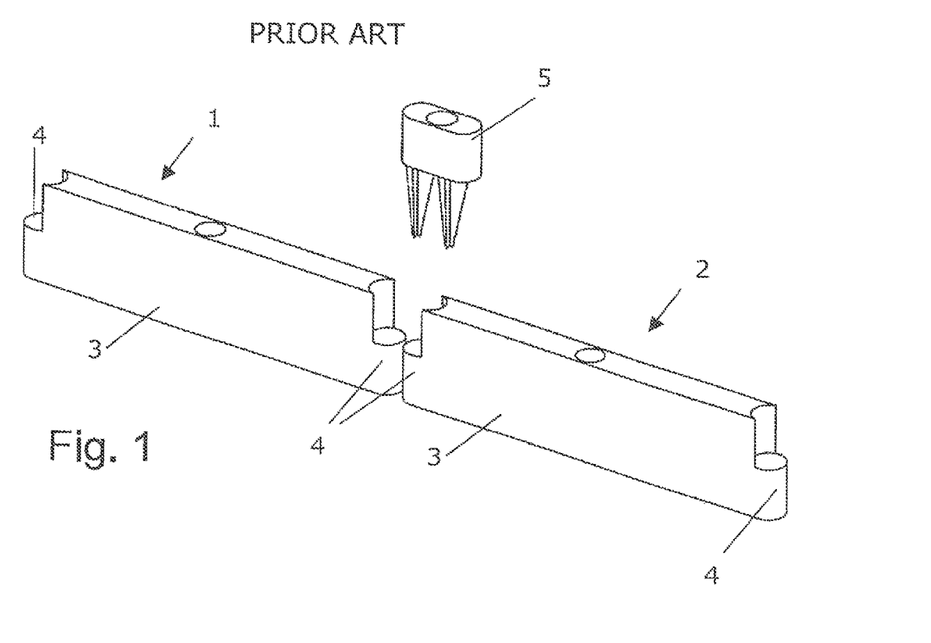
FIG. 1 illustrates a boundary wall in accordance with the prior art.

FIG. 1 illustrates a prior art boundary wall that includes a pair of oblong construction elements 1, 2. The construction elements 1, 2 each include a base body 3, showing at its face projecting end sections with connection elements 4 formed thereat to accept coupling elements 5. The construction elements 1, 2 are assembled in a manner known per se and connected in an arbitrary angle by the coupling element 5.

EP 0 981 948 B1 shows a boundary wall with elongated construction elements, strung together and connected to each other, each having a base body embodied from a profile hollow towards the bottom, which at its lateral faces is provided with laterally projecting end sections, carrying connection elements formed thereat. These connection elements are embodied to accept coupling elements, by which several construction elements can be connected to each other. For this purpose, coupling elements are known, which bridge the lower end sections of the construction elements arranged side-by-side, with these coupling elements themselves including connection elements, which are embodied complementarily to match the connection elements of the lower end sections of the construction elements. During assembly, the coupling elements are placed onto the connection elements of the lower end sections of the construction elements arranged side-by-side.

When producing such boundary walls in practice the problem arises that when the high bed is filled with earth or other filler material, the side walls tend to shift and/or distort. Although the coupling elements ensure that individual construction elements remain connected to each other in a fixed manner, however, the coupling elements cannot completely prevent any axial distortion of the construction elements mounted to each other.

In particular, in the corners, which generally are embodied right-angled or essentially right-angled, due to the pressure of the filler material filled in, bulging of the construction elements occurs, with the connection elements of the construction elements distorting.

A device for the framing of high beds is described in GB 39 08 90 A, in which the walls of the boundary are connected via clamping elements in order to prevent bulging. The clamping elements are directly mounted to the walls, though, thus in this area excessive stress of the material develops.

SUMMARY OF THE INVENTION

A technical objective of the invention, therefore, is to provide a boundary wall which reinforces or otherwise stabilizes the components and prevents their distortion. It shall be possible to erect the boundary wall in a simple and easy fashion, and particularly, shall prevent any excessive additional costs in reference to boundary walls known from prior art. The device for reinforcing shall be robust and reliably hold the boundary wall in its position in various geometric arrangements, even when large amounts of filler material is inserted into the framed area.

This objective is attained in accordance with embodiments of the invention such that at least two construction elements/components at end sections thereof include a device for a form-fitting acceptance of at least one reinforcing coupling element which serves to connect the construction elements with each other and/or with other construction elements.

In accordance with embodiments of the invention, a boundary wall for framing beds, hotbeds, boundaries in gardens and green areas is provided, the boundary wall including at least one of the following: construction elements each construction element having a base body with connection elements, and a first coupling element configured to connect neighboring construction elements to each other.

In accordance with embodiments of the invention, a boundary wall including at least one of the following: a first construction component supported by a first base element and a second construction component supported by a second base element; a first coupling element configured to connect the first construction component to the second construction component at a first connection area; a second coupling element configured for support on the first construction component and the second construction component to thereby connect the first construction component to the second construction component at a second connection area; and a third coupling element configured for receipt by the first base element and the second base element to thereby connect the first construction component to the second construction component at a third connection area.

In accordance with embodiments of the invention, a boundary wall including at least one of the following: construction components supported respectively by a base element; a first coupling element configured to connect neighboring construction components to each other at a first connection area; a second coupling element configured for support by the neighboring construction components to thereby connect the neighboring construction components to each other at a second connection area; and a third coupling element configured for receipt by the base elements of neighboring construction components to thereby connect the neighboring construction components to each other at a third connection area, wherein the first coupling element has at least one opening configured to receive at least one reinforcing bar configured to connect two diagonally-spaced first coupling elements, and a projection configured to receive a connection tube configured to connect two non-diagonally-spaced first coupling elements.

In accordance with embodiments of the invention, it is provided that these reinforcing coupling elements can be provided in addition to known coupling elements, it is an essential feature of the invention that the coupling element connects neighboring construction elements, i.e., construction elements which are spatially located side-by-side to each other. Furthermore, it may be provided that two or more coupling elements are connected to each other, and thus, they allow the reinforcement of the entire construction or parts of the entire construction.

In accordance with embodiments of the invention, the device for the form-fitting acceptance of the coupling element is embodied in the area of the end sections of the construction elements as unilaterally open slots or grooves in the connection elements. This way, the coupling elements in accordance with embodiments of the invention can be inserted into these unilaterally open slots or grooves and thereby be fixed in a form-fitting manner.

In accordance with embodiments of the invention, the coupling elements are embodied as plate-shaped. In particular, the coupling elements can be embodied as plastic plates. The coupling elements can have at their perimeter at least two T-shaped coupling bars, which include a neck section and a head section. In accordance with embodiments of the invention, the neck section has a smaller width than the head section. The neck section can be embodied such that it can be inserted into the slot and/or groove of the connection elements in a form-fitting fashion, and the head section may project the slot inside the connection elements in the inserted state and fixate the position of the coupling element in a form-fitting fashion.

In accordance with embodiments of the invention, a coupling element includes at least two such coupling bars in order to allow using one coupling element for the fixation of at least two neighboring construction elements located side-by-side and/or abutting. The coupling elements can have more than two coupling bars. The coupling elements can also be embodied such that they allow both the coupling of two essentially straight extending, neighboring construction elements as well as a coupling of two neighboring construction elements essentially arranged perpendicularly or in any other angle. In particular, it can be provided that the coupling element has four coupling bars.

In order to allow not only an additional connection of two abutting, (either straight-lined or right-angled or showing any other angle) components but furthermore the reinforcement of different, particularly opposite boundary walls, it may be provided in accordance with embodiments of the invention that the coupling element has at least one opening, preferably a bore, to accept at least one reinforcing, preferably metallic bar, with the bar being embodied to connect two coupling elements spatially distant from each other. In particular, the bar may be embodied to connect two diagonally opposite coupling elements, thus allowing the fixation of a certain angle, preferably 90°. The bar may represent particularly a metallic, tensile and pressure resistant bar.

Furthermore, the coupling element may show at least one projection to accept a preferably metallic connection tube, which may be embodied for the connection of two essentially opposite coupling elements. In particular, it may be provided in accordance with embodiments of the invention that the bars are provided for reinforcing 90° connections and the connection tubes for the reinforcement of boundary wall components extend in parallel.

Further, in accordance with embodiments of the invention, it is provided that a coupling element is arranged in the area of the connection elements, connecting the construction elements, which is placed from the top onto the connection elements as known from prior art.

In accordance with embodiments of the invention, additional base elements may be provided that can be connected to the construction elements. These base elements may also include connection elements and show recesses at their bottoms for the form-fitting acceptance of at least one reinforcing form part connecting the base elements.

This form part in accordance with embodiments of the invention may essentially be embodied as a dumbbell-shaped locking element, which can be inserted a form-fitting fashion into circularly cut out recesses of the connection elements of the base element counteracting any mutual distortion of the base elements. In accordance with embodiments of the invention, these recesses may be embodied such that they accept the locking elements in a form-fitting fashion, with two base elements each can be connected to each other by a locking element.

Of course, these recesses in accordance with embodiments of the invention may also be provided at the bottom of the construction elements themselves, so that the use of the form parts and/or locking elements is not limited to the base elements.

In accordance with embodiments of the invention, these form parts and/or locking elements permit particularly to reinforce corner connections and to counteract a mutual distortion of the construction parts and/or the base elements.

In accordance with embodiments of the invention, the recesses show opening grooves to insert the form parts and/or locking elements, which are mounted in different areas at the circumference of the connection elements, thus allowing to reinforce for example 30°, 45°, 60°, or 90° connections with the help of this form part.

Additional features in accordance with embodiments of the invention are discernible from the description, the claims, or the figures.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

Figure 2:
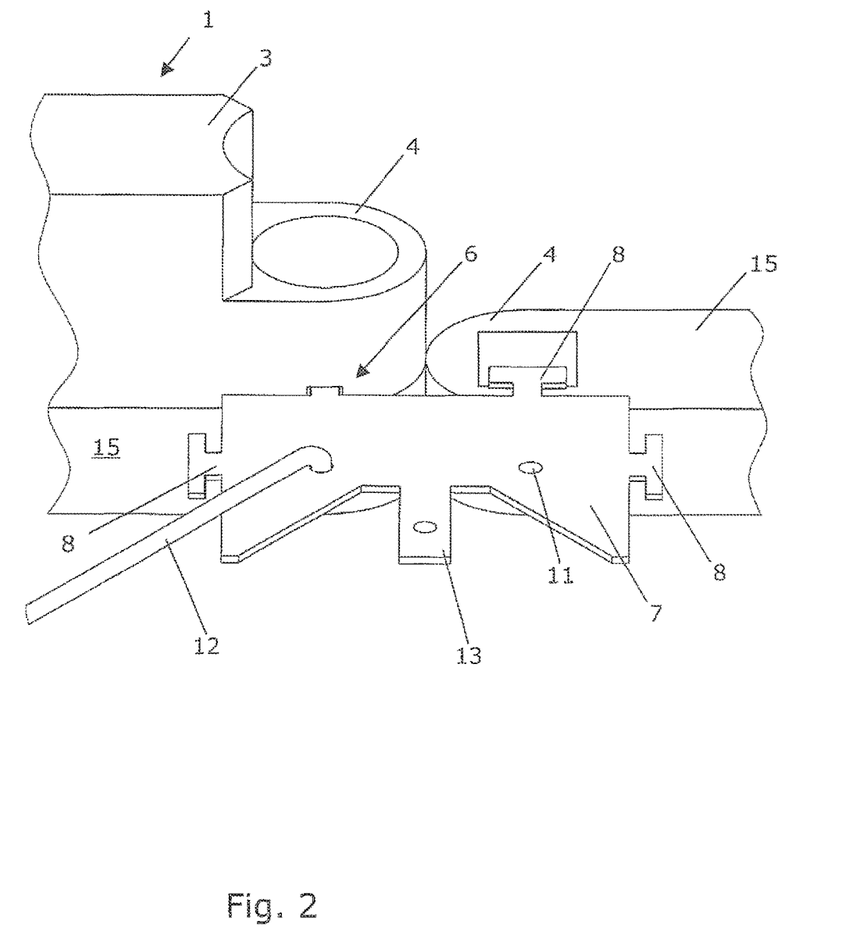
FIG. 2 is a schematic, three-dimensional illustration of a boundary wall with an inserted coupling element in accordance with embodiments of the invention.

FIG. 2 illustrates a schematic illustration of a boundary wall in accordance with embodiments of the invention with a first construction element 1 and a pair of base elements 15. The first construction element 1 includes a base body 3, having at projecting end section thereof a connection element 4. A slot 6 being provided in the connection elements 4 and configured to receive a corresponding coupling bar 8 of a first coupling element 7. The second construction element 2, which is also placed upon a corresponding base body 15, is not illustrated in this exemplary embodiment. The coupling element 7 has a projection 13 extending therefrom and a plurality of openings 11 sized to receive by insertion a bar 12. Each base element 15 is configured to receive a corresponding one of the construction elements 1, 2.

Figure 3:
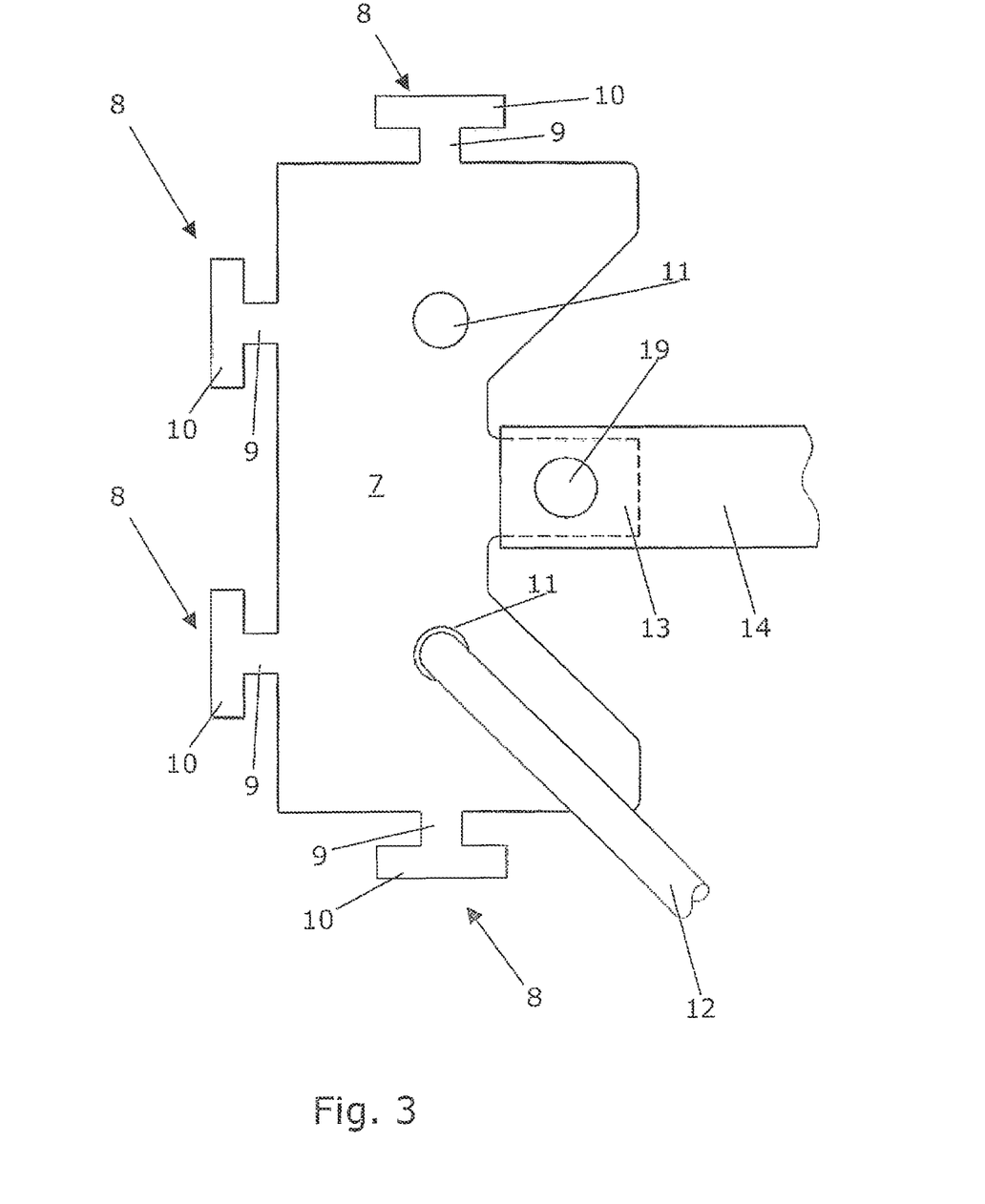
FIG. 3 illustrates a schematic top view of the coupling element in accordance with embodiments of the invention.

FIG. 3 illustrates the first coupling element 7 in accordance with embodiments of the invention, which includes a plurality of coupling bars 8 at its circumference. Each coupling bar 8 has a neck section 9 and a head section 10. The neck section 9 corresponds to the width of the slot 6 of the construction elements 1, 2 such that the neck section 9 can be received therein these supports and/or grooves to thereby permit a form-fitting connection. The projection 13 is sized to receive a connection tube 14 provided with an opening 19 in order to fixate the connection tube 14 at the projection 13. This fixation may occur, for example, via other mechanical fastening mechanisms such as a screw, a bolt, etc. The bar 12 is inserted in a form-fitting fashion into an opening 11 of the first coupling element 7.

Figure 4:
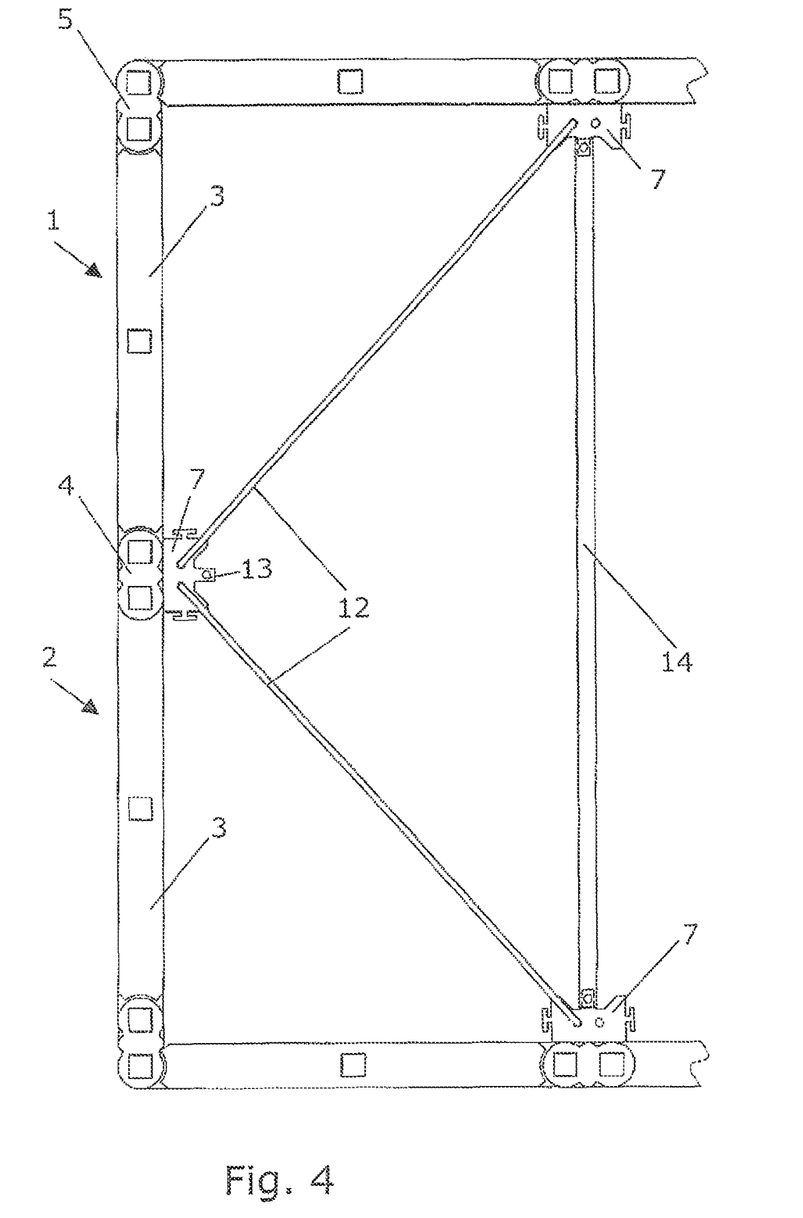
FIG. 4 illustrates a schematic illustration of a boundary wall in accordance with embodiments of the invention with three inserted coupling elements.

FIG. 4 illustrates a boundary wall in accordance with embodiments of the invention in an assembled state. A plurality of construction elements 1, 2 are connected to each other at a upper side thereof via the second coupling elements 5. The second coupling elements 5 rest on the connection elements 4 of the construction elements 1, 2.

In the area of these connection elements 4 the first coupling elements 7 are provided, which in turn are connected to each other and/or reinforced via the bars 12 and the connection tube 14. By such a two-dimensional reinforcement in one level it is ensured that both opposite boundary walls are held fixed with regards to their distance by the connection tube 14 as well as rectangular angles are fixated in their angle by the bars 12.

Figure 5A:
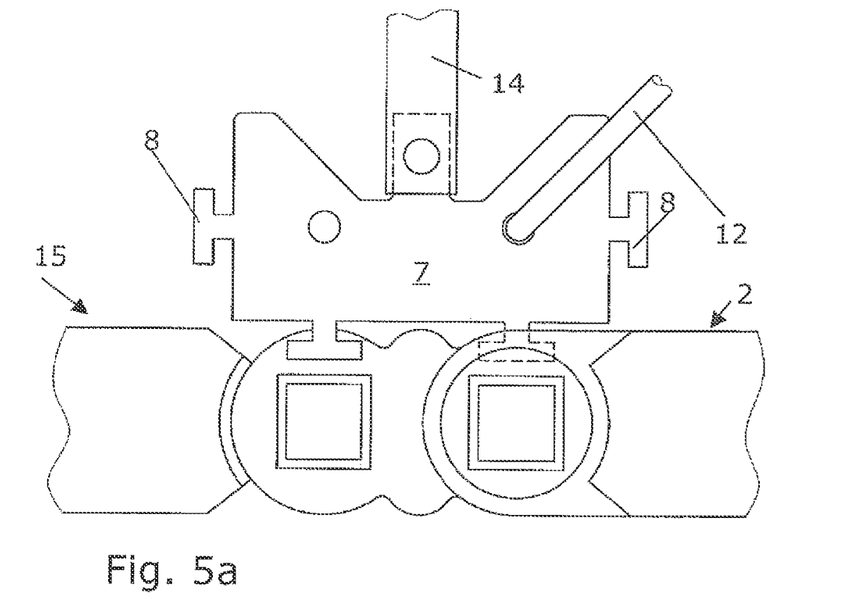
FIGS. 5a-5b illustrate schematic cross-sections through a boundary wall with a coupling element, in accordance with embodiments of the invention.

FIG. 5a illustrates a detail of the boundary wall in accordance with embodiments of the invention in the area of the connection of a first construction component 1 to a second construction component 2. In particular, this illustration shows a top view of the exemplary embodiment of FIG. 2. The first coupling element 7 rests on the base element 15. The second construction component 2 is placed upon the base element 15. A coupling bar 8 is inserted into the groove 6 of the second construction element 2 and partially covered.

Figure 5B:
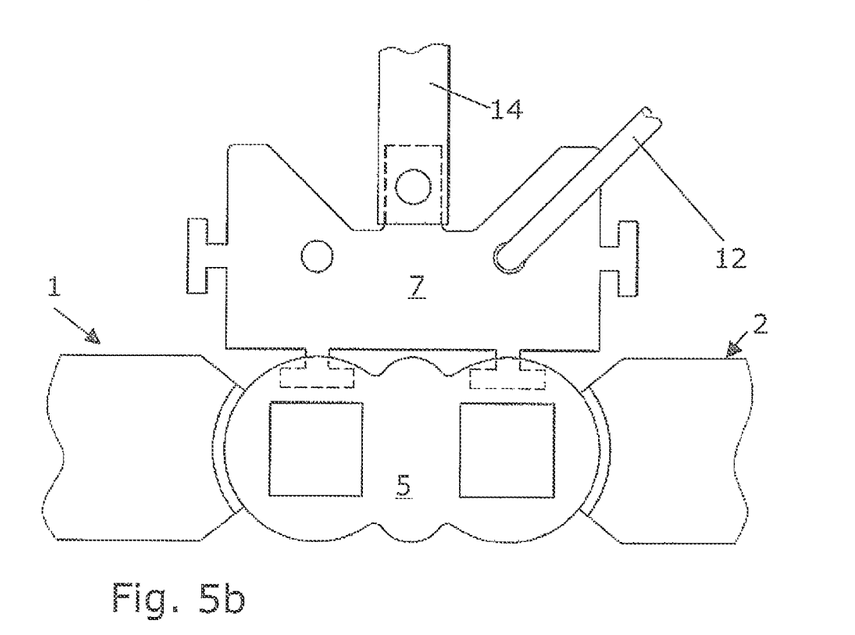

FIG. 5b illustrates the same view with the first construction element 1 being added and the second coupling element 5 is placed on the construction element 1. In this case, two coupling bars 8 of the first coupling element 7 are inserted into the grooves 6 of corresponding components 1, 2 and only partially visible.

Figures 6A, 6B:
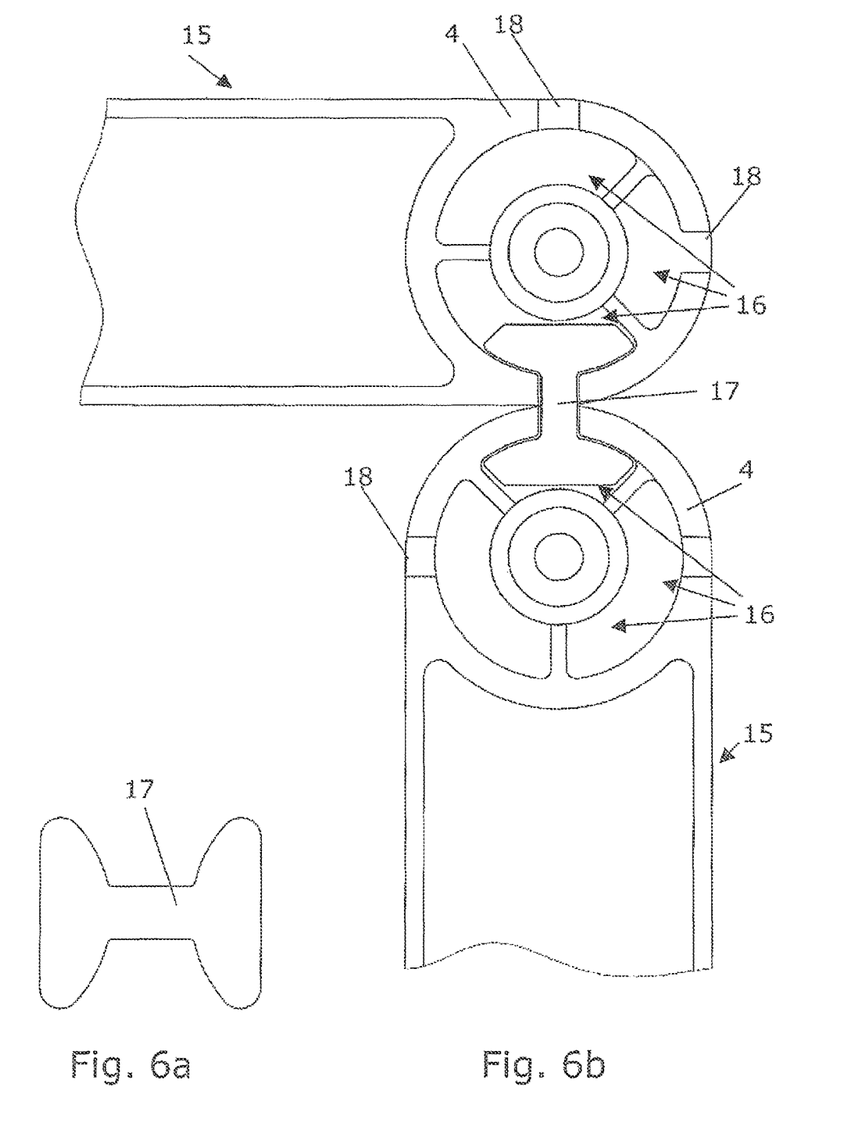
FIG. 6a is a schematic illustration of the form part in accordance with embodiments of the invention.
FIG. 6b is a schematic illustration of the bottom of two construction elements reinforced with the form part in accordance with embodiments of the invention.

FIG. 6a illustrates a form part 17 in accordance with embodiments of the invention in the form of a dumbbell-shaped locking element. FIG. 6b illustrates the use of this form part 17 to reinforce a corner connection of a boundary wall.

As illustrated in FIG. 6b, a view of the bottom of two base elements 15 is shown, arranged in a corner connection. The base elements 15 each have a plurality of recesses 16 and grooves 18 extending longitudinally from the recesses 16 to accept the form parts 17. The form of the grooves 18 and recesses 16 correspond to the shape of the form part 17 such that the form part 17 can be inserted into the grooves and/or recesses 16 in a form-fitting fashion, counteracting a distortion of the base elements 15 in the inserted state. The grooves 18 and the recesses 16 are arranged such that 90° corners are possible, here. In accordance with embodiments of the invention, other arrangements may also be provided, for example 30°, 60°, or 45° connections.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A boundary wall for framing beds, hotbeds, boundaries in gardens and green areas, the boundary wall comprising: construction elements to form the boundary wall, each construction element having a base body with a connection element at a projecting end section thereof, wherein each connection element has at least one slot; a coupling element received by neighboring construction elements to thereby couple the neighboring construction elements to each other at a first coupling area; and a reinforcing coupling element connected to the neighboring construction elements at the connection element so as to couple the construction elements to each other at the first coupling area, the reinforcing coupling element including a reinforcing coupling element base; and a plurality of reinforcing coupling element bars projecting from the reinforcing coupling element base, each one of the reinforcing coupling element bars having a neck section extending longitudinally therefrom and a head section extending transversely from the neck section.

2. The boundary wall of claim 1, wherein the neck section is for receipt into a corresponding slot of the connection element in a form-fitting fashion such that the head section projects into the corresponding slot.

3. The boundary wall of claim 1, wherein the plurality of reinforcing coupling element bars comprises four reinforcing coupling element bars provided at the perimeter of the reinforcing coupling element to permit coupling of two straight connected construction elements and also two rectangular connected construction elements.

4. The boundary wall of claim 3, wherein the coupling element has at least one opening configured to receive at least one reinforcing bar configured to connect two diagonally-spaced coupling elements.

5. The boundary wall of claim 4, wherein the reinforcing coupling element has a projection to receive a connection tube to connect two laterally-spaced reinforcing coupling elements to each other.

6. The boundary wall of claim 5, further comprising a second coupling element configured for support on the connection elements of neighboring construction elements to thereby connect the neighboring construction elements to each other at an upper region thereof.

7. The boundary wall of claim 6, further comprising a base element configured to support a respective construction element.

8. The boundary wall of claim 7, wherein the base element comprises a plurality of recesses and grooves at a bottom surface thereof.

9. The boundary wall of claim 8, further comprising a reinforcing form part for receipt into the grooves and recesses and thereby couple neighboring base elements to each other at a bottom region thereof.

10. A boundary wall comprising: a first construction element supported by a first base element, the first construction element having a first slot; a second construction element supported by a second base element, the second construction element having a second slot; a first coupling element to couple the first construction element to the second construction element to each other, the first coupling element having a first coupling bar projecting from the first coupling element for receipt into the first slot, and a second coupling bar projecting from the first coupling element for receipt into the second slot, the first coupling bar having a first neck section extending longitudinally therefrom and a first head section extending transversely from the first neck section such that the first neck section is received by the first slot and the first head section projects into the first slot, and the second coupling bar has a second neck section extending longitudinally therefrom and a second head section extending transversely from the second neck section such that the second neck section is received by the second slot and the second head section projects into the second slot; a second coupling element for support on and to couple the first construction element to the second construction element to each other; and a third coupling element to couple the first base element and the second base element to each other.

11. The boundary wall of claim 10, wherein:
the first base element has at a bottom surface thereof a first recess and a first groove extending from the first recess;
the second base element has at a bottom surface thereof a second recess and a second groove extending from the second recess; and
the third coupling element is received into the first and second recesses, and the first and second grooves.

12. A boundary wall comprising: a plurality of construction elements, each construction element having a slot; a base element to support a corresponding one of the construction elements; a first coupling element to connect neighboring construction elements to each other, the first coupling element having a first coupling bar projecting from the first coupling element for receipt into a slot of one of the construction elements, and a second coupling bar projecting from the first coupling element for receipt into a neighboring one of the construction elements construction element, the first coupling bar having a first neck section extending longitudinally therefrom and a first head section extending transversely from the first neck section such that the first neck section is received by the first slot and the first head section projects into the first slot, and the second coupling bar has a second neck section extending longitudinally therefrom and a second head section extending transversely from the second neck section such that the second neck section is received by the second slot and the second head section projects into the second slot; a second coupling element for support on and to connect neighboring construction elements to each other; a third coupling element to couple the first coupling element and the second coupling element to each other; a reinforcing bar to connect diagonally-spaced first coupling elements to each other; and a connection tube to connect two non-diagonally-spaced first coupling elements to each other.

13. The boundary wall of claim 10, wherein:
each of the first base element and the second base element respectively have at a bottom surface thereof a recess and a groove extending from the recess; and
the third coupling element is received into the respective recess and groove of neighboring base elements.

* * * * *